United States Patent [19]
Iizuka

[11] 4,138,693
[45] Feb. 6, 1979

[54] INFORMATION DENSITY DECISION CIRCUIT

[75] Inventor: Yoshio Iizuka, Sagamihara, Japan

[73] Assignee: Fujitsu Limited, Japan

[21] Appl. No.: 776,755

[22] Filed: Mar. 11, 1977

[30] Foreign Application Priority Data

Mar. 22, 1976 [JP] Japan .................................. 51-31093

[51] Int. Cl.² ............................................. H04N 1/17
[52] U.S. Cl. .................................................. 358/288
[58] Field of Search ................ 358/260, 288, 106, 107

[56] References Cited
U.S. PATENT DOCUMENTS 3,389,789  6/1968  Watson et al. ........................ 358/106
3,919,464  11/1975  Kondoh ................................ 358/260

*Primary Examiner*—John C. Martin
*Attorney, Agent, or Firm*—Staas & Halsey

[57] ABSTRACT

Herein disclosed is an information density decision circuit for deciding the information density of binary-coded signals within a specific section. According to the present invention, said circuit comprises first means to detect the transition points of the binary-coded picture signal, and second means responsive to detection of said transitions to count the number of the transitions of the binary-coded signal within a predetermined section being defined and to generate an output signal when said count has reached a certain value.

9 Claims, 6 Drawing Figures

INFORMATION DENSITY DECISION CIRCUIT

The present invention relates to an information density decision circuit used in a facsimile transmission system, and more particularly to an information density decision circuit in such system in which, in accordance with the number of transitions in a binary-coded picture signal within a certain section of a scanning line, the information density of the scanning line is determined.

In the field of facsimile transmission systems in which picture signals are transmitted by binary-code, a system is known which transmits such picture signals by changing, as desired, the information density for each picture according to the level of the picture element density of the subject figure. With this facsimile transmission system, the time required for transmission of picture information can be reduced because the picture information may be transmitted by reducing the density of the scanning lines if the image in a subject picture is simple. However, this prior-art facsimile transmission system is disadvantageous in that the density of the scanning lines cannot be reduced for transmission if complex and simple images are mixed in a picture to be transmitted.

To eliminate the above-mentioned drawback of the conventional facsimile transmission system, a solution has been proposed to estimate the amount of picture information for each scanning line in order to increase the scanning density for a complex image portion in one picture and reduce the scanning density for a simpler image. This proposed system is advantageous is that when a picture is to be transmitted, the scanning density can be changed as required in accordance with the image quality. In a case where there exists a very complex image in a portion of a picture, however, the image will disadvantageously be decided to be not so complex because the information of the image is averaged during the period of scanning one line.

An object of the present invention is to provide an information density decision circuit which permits the scanning of a picture at a proper information density by determining correctly the quality of a complex image, if any, in the picture.

The above-mentioned object is attained by providing an information density decision circuit for deciding the information density of binary-coded signals within a specific section, comprising, according to the present invention, first means to detect the transition points of the binary-coded picture signal, and second means responsive to detection of said transitions to count the number of the transitions of the binary-coded signal within a predetermined section and to generate an output signal when said count has reached a certain value.

The details of the present invention will become apparent from the ensuing description with reference to the accompanying drawings wherein.

Figure 1:
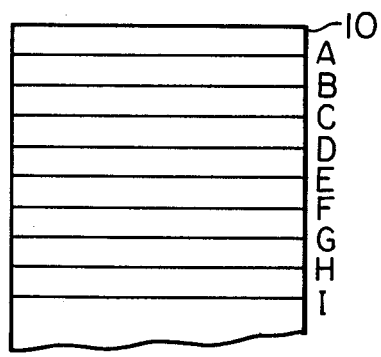
FIG. 1 is an explanatory view of a pattern of typical scanning lines in one embodiment of a facsimile transmission system.
Figure 4:
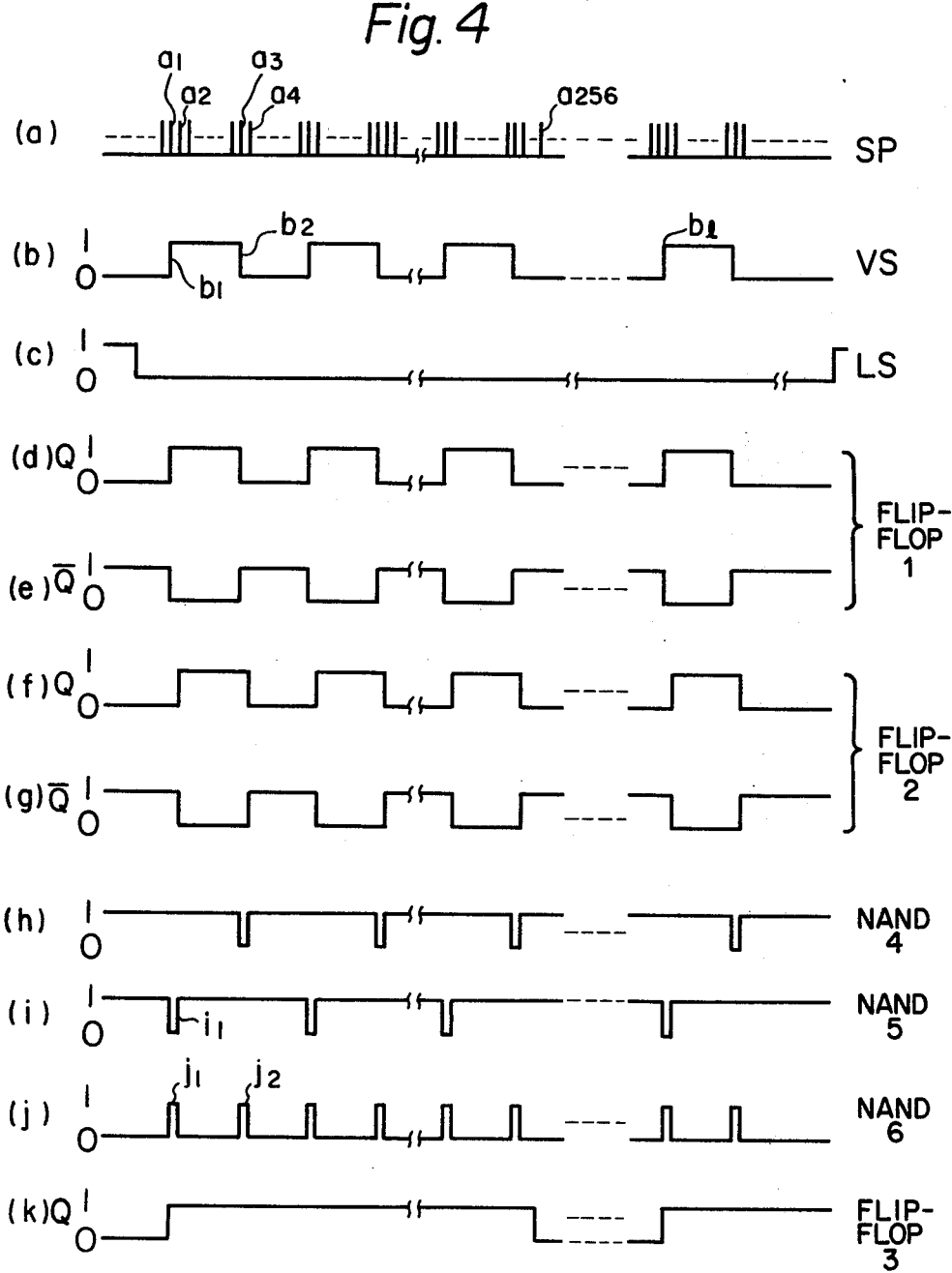
Figure 5:
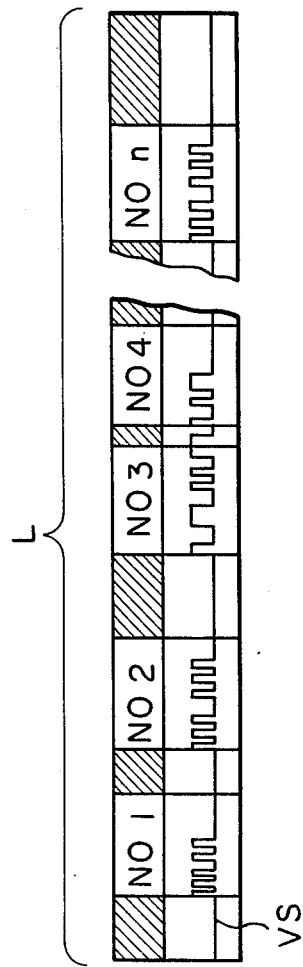

FIGS. 4(a) to 4(k) are time charts showing the waveforms of signals from the components in the circuit shown in FIG. 1; and FIG. 5 shows an arrangement of picture signals in one scanning line, and a predetermined section which begins following the time of detecting a black level.

Generally, facsimile information contained in one scanning line is relatively similar to facsimile information contained in a scanning line adjacent to said scanning line. Accordingly, if the density of the facsimile information is low, the facsimile information contained in one scanning line may be represented by the facsimile information contained in the scanning line adjacent to said scanning line. In recent years, a variable information density method has been proposed which is realized by utilizing the above-mentioned fact.

In one type of facsimile transmission system, the picture 10 to be transmitted is scanned by scanning lines A, B, C, D, . . . , etc., as shown in FIG. 1, and the information density in one scanning line (for example line B) is automatically controlled in accordance with the information density contained in a prior scanning line (for example line A).

Figure 2A:
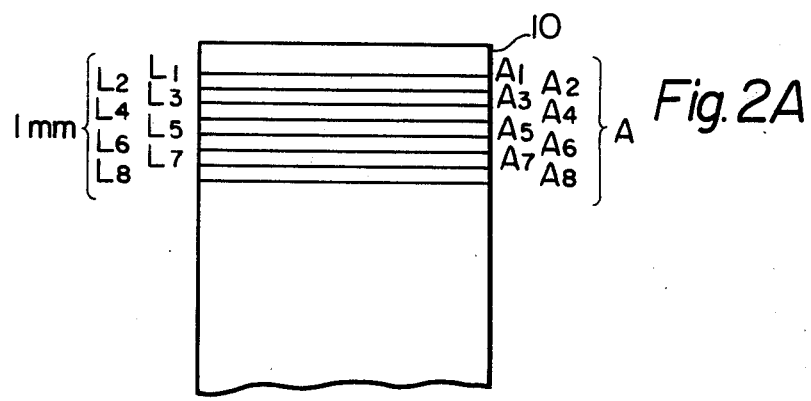
FIGS. 2A and 2B are explanatory views of patterns of typical scanning lines in another embodiment of a facsimile transmission system.

In another type of a facsimile transmission system, the scanning line density in the sub scanning direction is automatically controlled in accordance with the facsimile information contained in each scanning line. FIG. 2A is an explanatory view of a pattern of typical scanning lines in this type of system. In FIG. 2A, reference numeral 10 indicates a document to be scanned. The lines, $L_1$ through $L_8$ schematically indicate scanning lines scanned on the document 10 by a scanner (not shown) with a scanning line density of 8 lines/mm. As shown in FIG. 2A, in typical scanning, there is no abridgement of scanning lines. The symbols $A_1$ through $A_8$ stand for facsimile information contained respectively in the scanning lines $L_1$ through $L_8$.

Figure 2B:
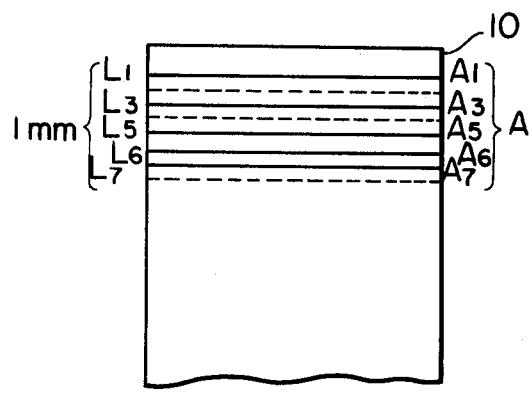

On the other hand, according to the above-mentioned variable scanning line density method, an explanatory view of which is shown in FIG. 2B, the scanning lines $L_2$, $L_4$ and $L_8$ are omitted as indicated by dotted lines in FIG. 2B. FIG. 2B shows one example of a pattern of scanning lines wherein the density of each of the facsimile informations $A_1$, $A_3$ and $A_7$, contained respectively in scanning lines $L_1$, $L_3$ and $L_8$, is low. In accordance with the variable scanning line density method, when the density of the facsimile information $A_1$ in scanning line $L_1$ is low, the facsimile information $A_2$ (see FIG. 2A) in scanning line $L_2$ is represented by the information $A_1$ and, therefore, the scanning line $L_2$ can be abridged. Similarly, when the density of each of the facsimile informations $A_3$ and $A_7$ is low, the facsimile informations $A_4$ and $A_8$ (see FIG. 2A) are represented by the informations $A_3$ and $A_7$ respectively and, therefore, the scanning lines $L_4$ and $L_8$ can be abridged. Whether each of the scanning lines contains a low density of facsimile information or not is automatically determined by a discriminator. The discriminator counts the number of transitions from black to white and from white to black and, thereby, determines whether each scanning line has a low density of facsimile information or not.

In the above-mentioned types of facsimile transmission systems, if there exists a very complex image in a portion of a picture, the information density in one scanning line is disadvantageously determined not to be so complex because the information of the image is averaged during the period of one scanning line.

Figure 3:
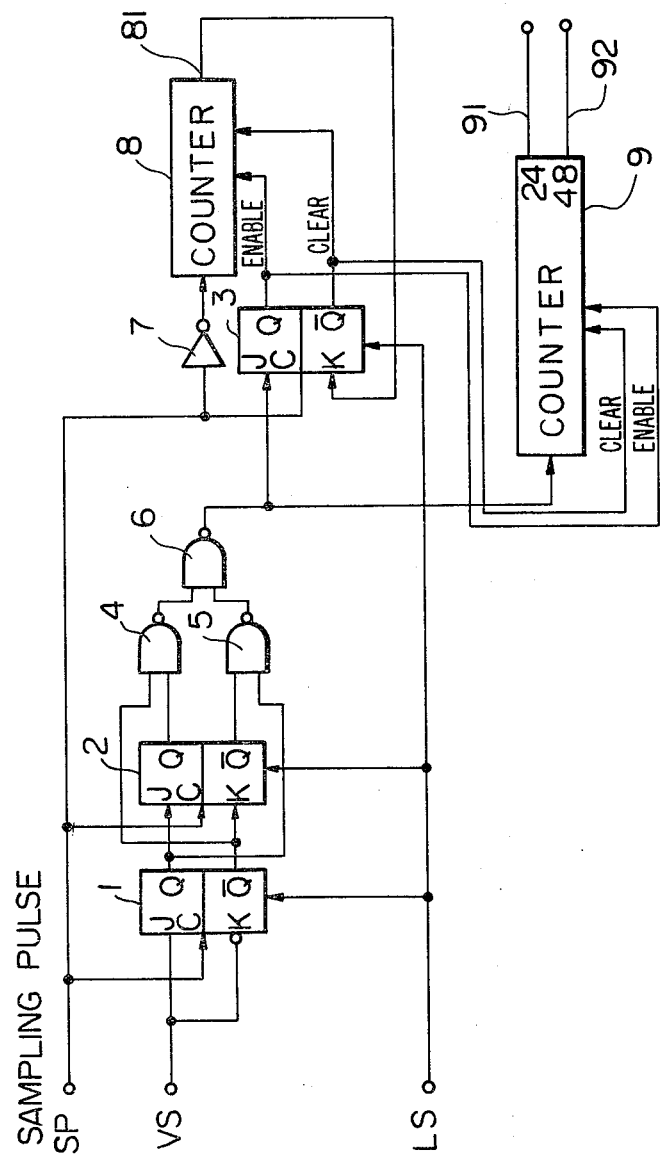
FIG. 3 shows, in the form of a block diagram, one embodiment of an information density decision circuit according to the present invention.

FIG. 3 is a block diagram of one embodiment of the information density decision circuit of the present invention. The reference numerals 1, 2 and 3 in this illustration represent J-K flip-flop circuits; 4, 5 and 6 denote NAND circuits; 7 an inverter; 8 a counter which delivers one pulse at the output terminal upon having counted, for example, 256 sampling pulses, and the numeral 9 indicates a counter which provides one pulse when the count of input pulses reaches 24, and another pulse when the count has reached 48.

Next, the operation of the above-mentioned embodiment will be described with reference to the time charts in FIG. 4.

FIG. 4(a) represents the waveform of the sampling pulse applied to an input terminal SP shown in FIG. 3. FIG. 4(b) represents a picture signal wherein binary values "1" and "0" indicate respectively black and white signals produced by scanning a picture, said picture signal being applied to an input terminal VS shown in FIG. 3. FIG. 4(c) represents a waveform of a line reset signal applied to an input terminal LS shown in FIG. 3 prior to the start of scanning each line.

When the line reset signal indicated in FIG. 4(c) is applied to the input terminal LS, flip-flops 1, 2 and 3 are reset at the falling time of said reset signal and the counters 8 and 9 are cleared. Further, when a picture signal indicated in FIG. 4(b) is applied to the input VS and rises as indicated at $b_1$ (namely, the white level changes to the black level), the flip-flop 1 is inverted at the falling time of a subsequent sampling pulse $a_1$ applied to the clock input terminal C of the flip-flop 1. Thus, the output Q and $\overline{Q}$ of the flip-flop shown in FIG. 3 become an "1" and "0" as shown in FIGS. 4(d) and (e). When said flip-flop 1 is inverted, the flip-flop 2 will be inverted at the falling time of a subsequent clock pulse $a_2$ which is applied to the clock input terminal C of the flip-flop 2 in FIG. 3. As shown in FIGS. 4(f) and (g), the outputs Q and $\overline{Q}$ of the flip-flop 2 shown in FIG. 3 are "1" and "0." That is to say, the flip-flop 2 shown in FIG. 3 is inverted one sampling pulse later than the flip-flop 1. During this operation, at time $a_1$ the signal levels at the two input terminals of NAND circuit 5 (Q of flip-flop 1 and $\overline{Q}$ of flip-flop 2) shown in FIG. 3 become "1" at the same time and the level at the output terminal of the NAND circuit 5 shown in FIG. 3 becomes "0" as shown in FIG. 4(i). As a result, one of the input terminals of NAND circuit 6, that is, the terminal connected to the output terminal of NAND circuit 4, remains "1" in signal level, while the other input terminal, namely, the terminal connected to the output terminal of NAND circuit 5 becomes "0" in signal level. The NAND circuit 6, then, delivers a pulse $j_1$, shown in FIG. 4(j), at its output terminal. With this pulse signal, the flip-flop 3 is inverted at the falling time of a next sampling pulse which is applied to the clock terminal of the flip-flop circuit 3 and the Q signal at the output terminal of said circuit 3 becomes "1" as shown in FIG. 4(k). With this output signal of said flip-flop circuit 3, the counter 9 is enabled and counts the transitions from "0" to "1" of the output pulses, namely, the picture signal, from the NAND circuit 6.

At the picture signal falling time as shown at point $b_2$, in FIG. 4(b), the flip-flop 1 is inverted again at the falling time of a subsequent sampling pulse $a_3$ shown in FIG. 4(a), which is applied to the clock input terminal C of the flip-flop 1 shown in FIG. 3, so that the outputs Q and $\overline{Q}$ of the flip-flop 1 become "0" and "1" as shown in FIGS. 4(d) and (e), respectively. Because of this inversion of flip-flop 1, the flip-flop 2 is also inverted again at the falling time of a next sampling pulse $a_4$ which is applied to the clock input terminal C of the flip-flop 2 shown in FIG. 3, so that the outputs Q and $\overline{Q}$ of the flip-flop 2 become "0" and "1" as shown in FIGS. 4(f) and (g), respectively. The signal levels at the two input terminals of the NAND circuit 4 become "1" at the same time during the time period from the inversion of the flip-flop 1 to that of the flip-flop 2 and, thus, the signal level at the output terminal of the NAND circuit 4 becomes "0" as shown in FIG. 2(h). Accordingly, since only one of the input terminals of the NAND circuit 6 becomes "0" in signal level, the output terminal of the NAND circuit 6 delivers a pulse $j_2$ shown in FIG. 2(j).

The pulse signal $j_2$ is applied to the input of counter 9 which counts this pulse. The pulse $j_2$ is also applied to the J terminal of the flip-flop 3; however, this flip-flop 3 is not inverted and maintains the status of Q=1. Thus, the counter 8 continues, to be enabled and to count clock pulses.

When successive picture signals at levels "1" and "0" are alternately applied to the input terminal VS, the NAND circuit 6 delivers pulses, which will be counted by the counter 9, each time the levels of picture signals change from "1" to "0" or vice versa. When the count of the pulses reaches 24, for example, one pulse is delivered from an output terminal 91 of the counter 9. When the count of the pulses reaches 48, the counter 9 delivers one pulse at an output terminal 92.

On the other hand, the counter 8 also enabled by the Q output of flip-flop 3 continuously counts the number of sampling pulses. When the count of sampling pulse arrives at 256, for example, an output pulse ("clean pulse") is delivered at an output terminal 81 from the counter 8. This output pulse signal is applied to the terminal K of the flip-flop 3 so that this flip-flop 3 is inverted at the falling time of a next sampling pulse and, thus, the output Q of the flip-flop 3 becomes "0" and the output $\overline{Q}$ of said flip-flop 3 becomes "1." In this way, both the counters 8 and 9 are cleared.

After termination of the above described one cycle of operation, when a picture signal of 1 as shown at $b_1$ in FIG. 4(b) is applied to the input terminal VS, the next cycle of the same operation described above is effected. Such cycle will be repeated if a black level signal is detected again after completion of one cycle of operation during the period of scanning one line. However, when one line is completely scanned, the line reset signal, as shown in FIG. 4(c) rises and the repetition of the cycles described above is terminated.

The above-mentioned sequence of operations will be further explained with reference to FIG. 5.

As seen in FIG. 5, one scanning line L is divided into predetermined sections which begin every time the "clear" pulse is supplied via terminal 81 from the counter 8 shown in FIG. 3.

The number of transitions of a picture signal in said sections is counted by the counter 9 and the section which has the greatest number of picture signal-level transitions along one scanning line is detected.

When one line is completely scanned, the output signals at the output terminals 91 and 92 of the counter 9 are checked. If no signal is found at either of these terminals during the scanning of one line, the scanning line is considered to consist wholly of simple images. Thus, no picture information on the subsequent two scanning lines is transmitted.

When it is known that an output signal is delivered more than once at the output terminal 91, a slightly more complex image is considered to exist in some section of the scanning line. Thus, the picture information of only the next scanning line is not transmitted. Further, if an output signal is delivered at the output terminal 92, the picture information of a subsequent scanning line is transmitted.

The embodiment described in the foregoing uses a counter which counts clocks in order to divide the scanning line into predetermined sections, following a black-signal detection. However, the counting means may be replaced with a time counter means, for example, an electronic timer. Further, it is obvious that the circuit according to the present invention may be arranged so as to count only the transitions of either rising time or falling time, instead of counting both the transitions as mentioned in the description of the embodiment described above.

As will be understood from the foregoing, the present invention divides one scanning line into sections starting from the detection of each black level along the scanning line in order to estimate the complexity of each image in a picture. Accordingly, no erroneous estimation occurs if any complex image is involved in a picture and even a picture which involves complex portions can be sharply transmitted.

What is claimed is:

1. An information density decision circuit for deciding the information density of binary-coded picture signals derived from scanning a picture along predetermined scanning lines, comprising:
   first means for detecting transition points of said binary-coded picture signal corresponding to information transitions in said scanning line of said picture,
   second means for counting the number of said transition points of the binary-coded picture signal within a section thereof and for generating an output signal when said count has reached a predetermined certain value indicating the decided information density of said picture signal; and
   enabling means responsive to detection of a first one of said transition points by said first means for enabling the counting of said second means, thereby defining the section of said binary-coded picture signal within which said number of transition points is counted by said second means.

2. An information density decision circuit according to claim 1, including means for providing sampling pulses, said second means being responsive to said sampling pulses for counting the number of said transition points in accordance therewith, and said enabling means being responsive to said sampling pulses for enabling the counting function of said second means in accordance therewith.

3. An information density decision circuit according to claim 1, said second means counting the number of either the transition from "1" bit to "0" bit or that from "0" bit to "1" bit of said binary-coded signals.

4. An information density circuit for determining the degree of complexity or simplicity of a given line in a picture scanned so as to develop a binary-coded picture signal indicating black-to-white and white-to-black transitions in said scanned line, comprising:
   means for providing sampling pulses defining a sampling rate,
   means for sampling said binary-coded picture signal in accordance with said sampling rate to detect transitions in said scanned line, and issuing a transition signal at each detection of said transitions, and
   means for counting said transition signals during a predetermined time to develop a count corresponding in value to said degree of complexity or simplicity of said given line,
   said circuit including means responsive to said sampling pulses and to detection of a first one of said transitions by said sampling means for enabling said counting of said counting means only for a predetermined time corresponding to a given section of said given line after said detected first one of said transitions, whereby to develop a count in said counting means corresponding in value to said degree of complexity or simplicity of said given section of said given line.

5. An information density decision circuit for determining the degree of complexity or simplicity of a given line in a picture scanned so as to develop a binary-coded picture signal indicating black-to-white and white-to-black transitions in said scanned line, comprising:
   means for providing sampling pulses defining a sampling rate,
   means for sampling said binary-coded picture signal in accordance with said sampling rate to detect transitions in said scanned line, and issuing a transition signal at each detection of said transitions, and
   means for counting said transition signals during a predetermined time to develop a count corresponding in value to said degree of complexity or simplicity of said given line,
   said circuit including means responsive to said sampling pulses for enabling said counting of said counting means only for a predetermined time corresponding to a given section of said given line, whereby to develop a count in said counting means corresponding in value to said degree of complexity or simplicity of said given section of said given line;
   wherein said enabling means comprises a counter for counting said sampling pulses up to a predetermined number thereof corresponding to said predetermined time, and a bistable device having a reset state for issuing a reset output signal initializing said counting means and said counter, and responsive to a first of said transition signals for assuming a set state so as to issue a set output signal enabling said counting by said counting means and said counter.

6. An information density decision circuit in a facsimile system for deciding the information density of binary-coded picture signals derived from scanning a picture along a scanning line, and for deciding an interval between said scanning line and a next scanning line in accordance with said information density, comprising:
   sampling pulse generating means for generating sampling pulses,
   detecting means responsive to said sampling pulses for detecting transition points of said binary-coded picture signal in said scanning line of said picture in synchronization with said sampling pulses,
   counting means for counting the transition points of the binary-coded signal during a predetermined time, and
   enabling means for enabling said counting of said counting means in accordance with the detection of a first one of said transition points of said binary-coded picture signal, said counting means generating an output signal when said count has reached a predetermined certain value indicating the information density.

7. An information density decision circuit according to claim 6, said counting means counting the transitions from "1" bit to "0" bit of said binary-coded picture signal.

8. An information density decision circuit as recited in claim 6 wherein said enabling means comprises
a counter for counting said sampling pulses up to a predetermined number thereof corresponding to said predetermined time, and a bistable device having a reset state for issuing a reset output signal for initializing said counting means and said counter and being responsive to the detection of said first transition point for assuming a set state so as to issue a set output signal enabling said counting by said counting means and said counter.

9. An information density circuit according to claim 6, said counting means counting the transitions from "0" bit to "1" bit of said binary-coded picture signals.

* * * * *

UNITED STATES PATENT AND TRADEMARK OFFICE
CERTIFICATE OF CORRECTION

PATENT NO. : 4,138,693
DATED : February 6, 1979
INVENTOR(S) : Yoshio Iizuka

It is certified that error appears in the above-identified patent and that said Letters Patent are hereby corrected as shown below:

Column 1, line 31, "is" (second occurrence) should be --in--.
Column 4, line 31, "clean" should be --clear--.

Signed and Sealed this

First Day of May 1979

[SEAL]

Attest:

RUTH C. MASON
Attesting Officer

DONALD W. BANNER
Commissioner of Patents and Trademarks